United States Patent Office 3,258,525
Patented June 28, 1966

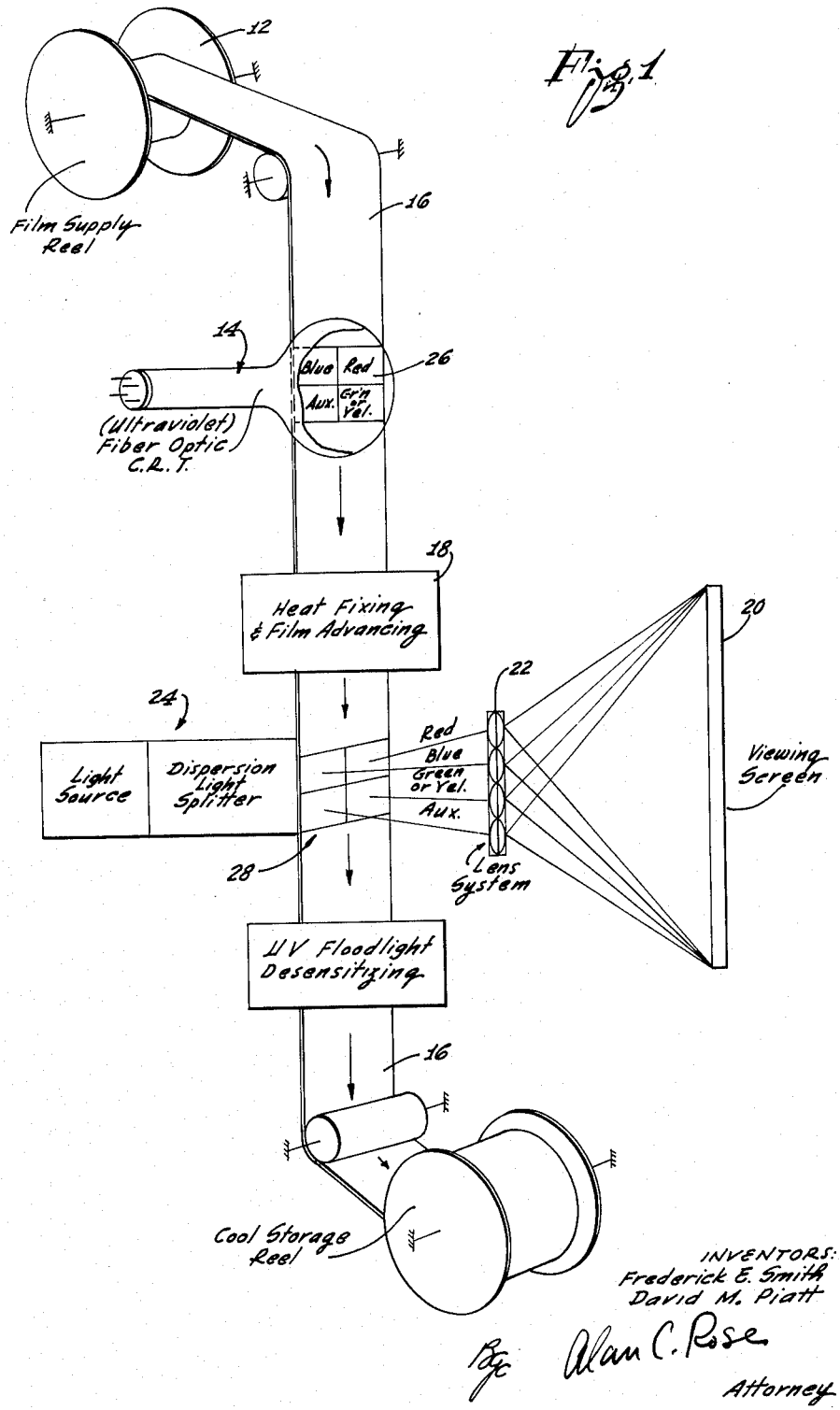

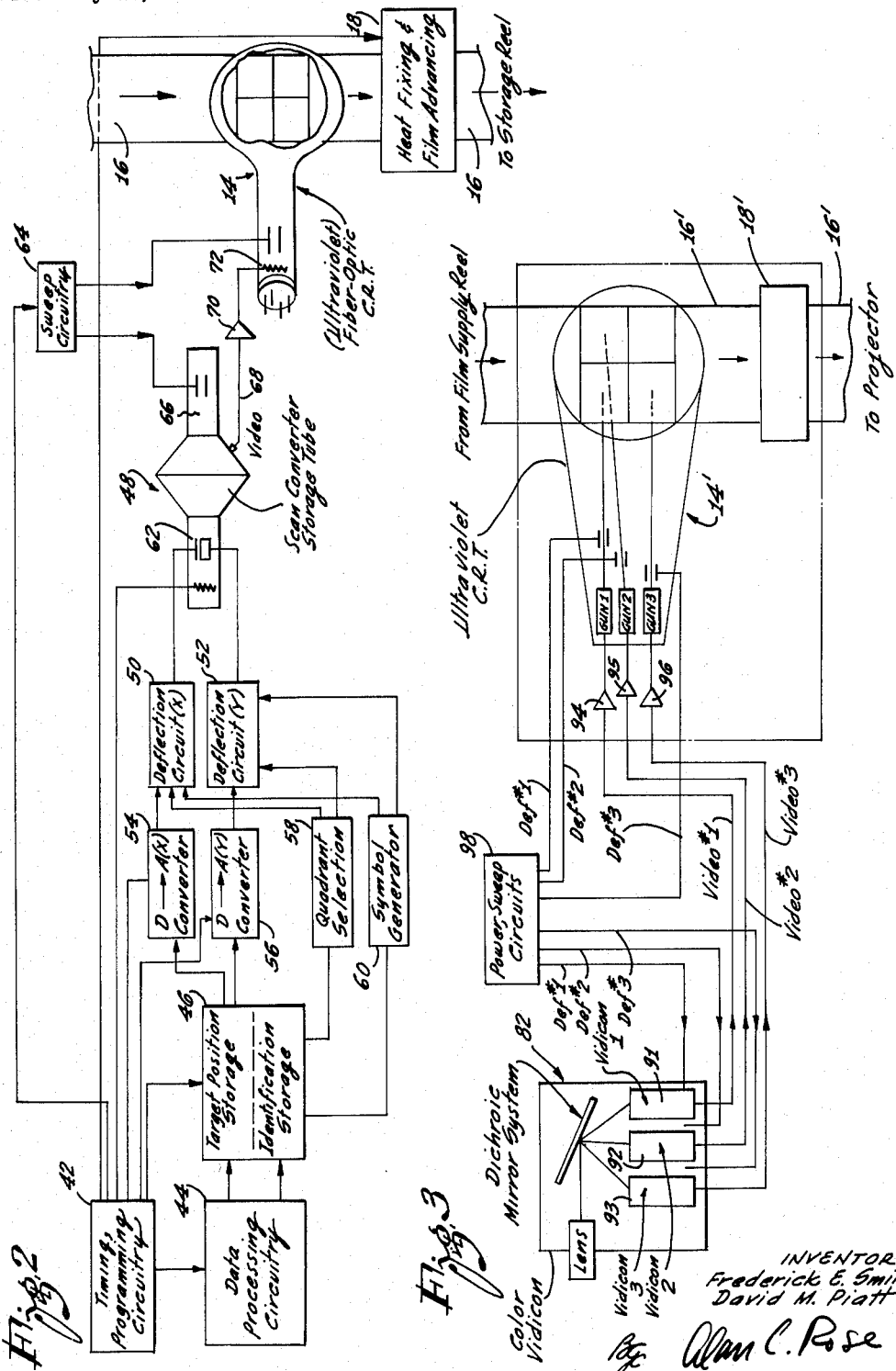

3,258,525
HIGH SPEED VIDEO DISPLAY APPARATUS
David M. Piatt, Reseda, and Frederick E. Smith, Tarzana, Calif., assignors to Litton Systems, Inc., Beverly Hills, Calif.
Filed May 25, 1961, Ser. No. 112,701
3 Claims. (Cl. 178—5.4)

The present invention relates to the reproduction of signal information and to its display.

Many arrangements have been proposed heretofore for reproducing and displaying information. However, particularly for large size viewing screens, no satisfactory video projection apparatus is available at the present time for presenting a large scale picture of an event or a tactical situation contemporaneously with the occurrence of the events to be displayed. Thus, for example, the theater presentation of boxing matches or football games as they occur is notoriously poor, with inadequate brightness being one major drawback. Similarly, the techniques for providing command and general staff maps are inefficient and lag far behind the actual occurrence of events.

A principal object of the invention is to improve and simplify apparatus for large scale contemporaneous displays.

In accordance with the present invention, the foregoing object may be achieved through the use of special forms of cathode ray tubes, and film which may be developed within a very short period of time. Particular features of the invention involve the application of video signals to special forms of cathode ray tubes. Advantageously, these cathode ray tubes may be of the fiber type in which fine signal-transmitting filaments pass through the faceplate of the cathode ray tube. Through the use of these fibers, high resolution and high signal intensity may be maintained so that the film is properly exposed. Such special forms of cathode ray tubes are particularly useful in view of the relatively poor sensitivity of the currently available films which may be developed quickly. Following development of the film in a few seconds, it may be projected on a large size viewing screen, preferably in color.

With regard to film which may be employed, a known form of film employing diazo compounds may be developed for projection merely by the application of heat for a short period of time, such as one or two seconds or less. This film operates through the formation of tiny gas bubbles when the film is exposed to ultraviolet light, and is then subjected to heat. The resultant small bubbles produce an image by scattering light in the regions where the bubbles are formed and permitting light to pass through in the other areas of the film where no bubbles are formed.

In one preferred embodiment of the invention, three or four frames may be projected simultaneously onto the same screen, and different colors may be transmitted through each frame. Such an arrangement may be employed to provide color-coded displays of information. Thus, for example, on a map, one class of data could be shown in one color and another class could be shown in a second color, and other types of information could be shown in still other colors. In the case of ultraviolet sensitive film, the film may be developed prior to projection, and then projected with light which is free from ultraviolet components. Subsequently, the film may be fixed by ultraviolet floodlight desensitizing, or other processes, as described below.

In accordance with another aspect of the invention, information regarding the position of a number of vehicles, airplanes or the like, may be successively entered into a storage tube and the storage tube information may be transferred to a fiber-type tube, as mentioned above, for the exposure of film.

The novel features which are believed to be characteristic of the invention both as to its organization and method of construction and operation, together with further objects and advantages thereof, will be better understood from the following description considered in connection with the accompanying drawing in which illustrative embodiments of the invention are disclosed by way of example. It is to be expressly understood, however, that the drawing is for the purpose of illustration and description only and does not define limitations of the invention.

In the drawing:

FIG. 1 is a diagram indicating the mode of operation of a film exposure and a projection system in accordance with the present invention;

FIG. 2 is a block diagram of the electronic circuitry for energization of the cathode ray tube included in the apparatus of FIG. 1;

FIG. 3 is an alternative arrangement illustrating the principles of the present invention, in which a set of three-color vidicon tubes are employed to energize cathode ray tube apparatus for exposing film;

Figure 4:
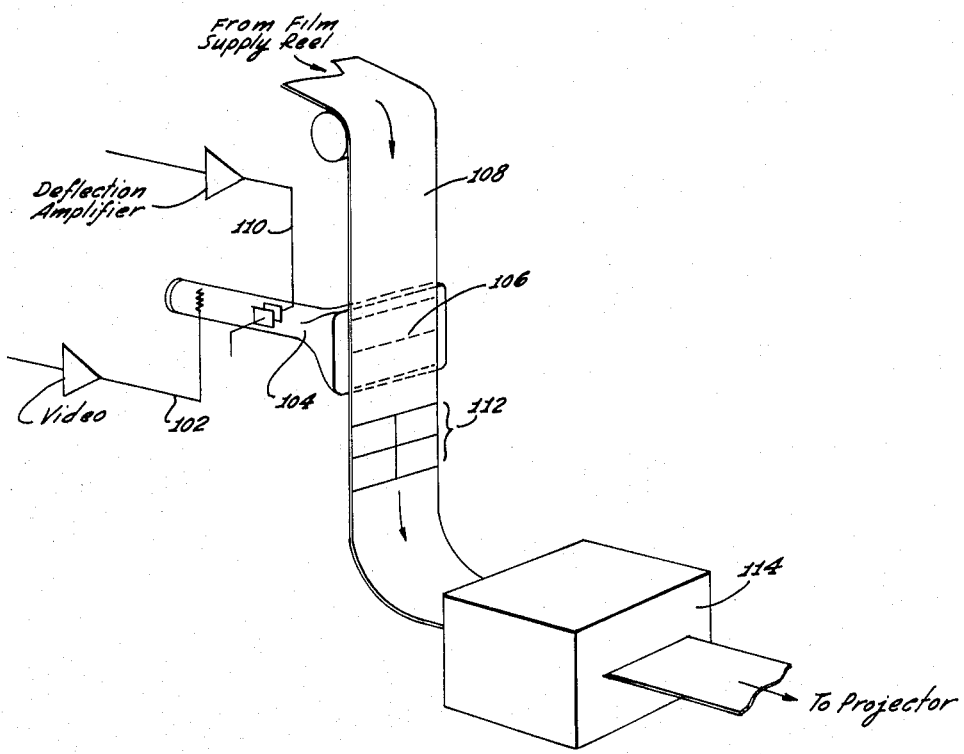
FIG. 4 shows an embodiment of the invention in which a conductive fiber-type cathode ray tube apparatus is employed.

Referring to the drawings, FIG. 1 shows an apparatus for exposing and projecting film. The apparatus of FIG. 1 includes the film supply reel 12, a cathode ray tube 14 for exposing the film 16, and arrangements for fixing the film and for advancing the film, as indicated by block 18. The block 18 may, for example, be implemented by a heated roller arrangement. Following the fixing step, the image is present on the film 16. The projection onto a large viewing screen 20 may be accomplished through the use of a lens system 22 in combination with a suitable light source 24. The film strip 16 may have successive sets of four frames applied to it by the fiber optic cathode ray tube 14. These four frames are indicated at 26 on the face of the cathode ray tube 14 and at 28 in the optical system including lenses 22 and the light source 24. Following the projection step, the film may be fully developed in the unit 30 and may then be stored on the output reel 32.

The film employed in the process of FIG. 1 is preferably one which may be rapidly fixed. Thus, for example, the information supplied to the tube 14 by electronic circuits (to be disclosed in detail below) should appear on the projection screen 20 within a very few seconds. Certain type of film are susceptible to rapid development merely by the application of heat in a dry process. One such film is known as "Kalvar" film, and it involves a plastic emulsion containing distributed diazo salts. When exposed to ultraviolet light, these salts release gas in proportion to the amount of incident light. Heating the film following exposure makes the gas expand to form layers of tiny bubbles. These bubbles prevent the direct transmission of light through a scattering phenomenon and provide the image on the film negative. This process is described in an article which appears on pages 107 and 108 of the December 10, 1960, issue of "Business Week" and also in U.S. Patent No. 2,911,299, granted November 3, 1959. The film is available from the Kalvar Co. of 909 South Broad Street, New Orleans 25, Louisiana. Other known films which may be developed by simple and rapid processes may be used.

These need not be of the ultraviolet sensitive type. Other suitable films are disclosed in the references cited in U.S. Patent No. 2,911,299 and in an article entitled, Arylamine-Carbon Tetrabromide System Giving Print-Art Dye Images, by R. H. Sprague, H. L. Fichter and E. Wainer, Photographic Science and Engineering, vol. 5, No. 2, part 1, March-April 1961, pages 98–103.

With regard to the cathode ray tube 14, it may be of the fiber optic type, as disclosed below in connection with FIG. 5 of the drawings. Furthermore, the tube may be provided with phosphor material having its principal light emission in the ultraviolet spectral region. Fiber optic type tubes are also disclosed in greater detail in the copending patent application, Serial No. 83,330 of Norman F. Fyler, entitled, "Cathode Ray Tube," filed January 17, 1961.

When ultraviolet sensitive film of the type noted above is employed the time required between exposure and projection may be reduced by the procedure described below.

Following the steps of fixing the image on the film and advancing the film to the optical system, in FIG. 1, light is applied to the film to project the image onto the viewing screen 20. In a preferred embodiment of the invention, however, the light source 24 may be of the dispersion type, which separates the various colors which are employed. This can be accomplished in accordance with known techniques either by the use of a prism or by dichroic mirror arrangements. Through the use of this technique, no ultraviolet light is applied to the film in the optical system. This permits projection of the image within a very few seconds following the formation of the image on cathode ray tube 26.

The desensitization step may be accomplished by the unit 30 following projection. The unit 30 may provide ultraviolet floodlighting, and the film is subsequently stored at room temperature on reel 32. Heating should be avoided since it would fix the image. Without heating, the gas formed by the ultraviolet exposure step is diffused through the emulsion on the surface of the film.

As an alternative, the heat fixing step may be accomplished directly on the faceplate of the cathode ray tube 14. This may be realized by maintaining the faceplate at an elevated temperature. In addition, if desired, the heat of the cathode ray tube faceplate may be supplemented by additional heat, such as that from an infrared lamp. It may also be noted that, in some cases, where the heating step renders the image permanent, the ultraviolet floodlight desensitizing step indicated by block 30 in FIG. 1 may not be necessary.

FIG. 2 of the drawings shows the electronic circuitry for supplying signals to the cathode ray tube 14. It may be noted that the cathode ray tube 14 appears both in FIG. 1 and at the right-hand side of the circuit of FIG. 2. In FIGS. 1 and 2, the film is shown passing behind the tube 14, and the tube is broken away to indicate the four quadrants of color coded information which are impressed on the film 16. The electronic circuitry of FIG. 2 is shown in block diagram form. It includes the timing and programming circuitry 42 and the digital data processing circuits 44. Associated with the data processing circuits 44 is a storage unit 46. The storage unit 46 may, for example, store target position information and other information about particular targets. In one exemplary system, radar and other information may be supplied to the data processing circuitry 44. Following the processing of the raw data, the target storage position and information indicating whether the particular target is friendly, enemy or unidentified, may be stored in the unit 46.

In order to present a meaningful display on the faceplate of the cathode ray tube 14, a number of circuits may advantageously be included between the storage unit 46 and the tube 14. These circuits include a scan converter storage tube 48, the deflection circuits 50 and 52, digital to analog conversion circuits 54 and 56, a quadrant selection circuit 58, and a symbol generator 60. The sweep circuit 64 may also be provided to scan the information stored in the tube 48 and also to provide the sweep signals to the cathode ray tube 14.

In operation, the information relating to targets which is included in the storage unit 46 is applied to the storage tube 48 by the operation of circuits 50, 52, 54 and 56. Specifically, the X and Y coordinates of a given target may be supplied in digital form from store 46 to the converters 54 and 56. The converters 54 and 56 may be of a conventional nature; thus, they may include shift registers and suitable resistor weighting networks. The deflection circuits 50 and 52 supply the necessary potentials to the plates 62 of the tube 48 to produce the desired deflection of the electron beam. In the presentation on the faceplate of tube 14 it is desired that signals representing friendly aircraft shall appear in one quadrant for ultimate presentation in a particular color, such as green, whereas signals representing enemy aircraft should be projected into another quadrant for ultimate projection in red, for example, on the viewing screen 20 of FIG. 1. The quadrant selection circuit 58 provides additional voltage to the deflection circuits 50 and 52 to select one of the four quadrants, depending upon the identification information associated with each target position in the storage unit 46.

It is also desirable in some cases to provide symbolic information at each target position. Thus, for example, one might wish to identify jet aircraft by circles and piston type planes by triangles or other symbols. Suitable signal generation circuitry is provided in block 60 for modifying the deflection signals to produce the desired symbols at the target location. Well-known circuits, such as those employed for forming Lissajou figures, would normally be included in the circuitry of block 60.

The targets are applied serially to the input side of the scan converter tube 48. The electron beam on the output side 66 of the tube 48 is swept in a systematic manner by signals from the sweep circuit 64. Corresponding sweep signals are applied to cathode ray tube 14. As the electron beam is swept across the storage area of tube 48, a video output signal is produced on lead 68. This video signal is routed through the amplifier 70 to the grid 72 of cathode ray tube 14. In this manner the target data which is supplied in succession to the various points in the storage matrix of tube 48 is transferred to cathode ray tube 14 and appears in a conventional raster form on its faceplate.

The scan converter storage tube 48 may be of any known form which is available commercially. Thus, for example, a preferred type of storage tube is available from the Machlett Laboratories under the designation TMA-403X, as a video transformation tube. By the choice of a storage material with a suitable persistency, for example about a five-minute persistency, the targets may be provided with a fading trail on tube 14, thus indicating both the direction and the speed of the target.

FIG. 3 shows an alternative arrangement of the invention in which a color vidicon pick-up apparatus 82 supplies the input video information. The input signal information is supplied to three separate electron guns 84, 86 and 88 in the cathode ray tube 14'.

Passing across in front of the faceplate of the cathode ray tube 14' is the film 16' with its associated heated roller 18' for advancing the film and fixing the image impressed upon the film 16' by the cathode ray tube 14'. The video signals from the three vidicon tubes 91, 92 and 93 are supplied via amplifiers 94, 95 and 96 to the electron guns 84, 86 and 88, respectively, of the cathode ray tube 14'. The deflection signals for the three vidicon tubes 91 through 93 are synchronized with those for the three guns 84, 86 and 88. The common power and sweep voltages for the vidicon tubes and the cathode ray tube 14' are supplied by the power unit 98. In the case of remotely located vidicon units, synchronizing signals for local sweep circuits may be transmitted to the location of the cathode ray tube and the projection unit.

The single cathode ray tube 14' may be replaced by the three cathode ray tubes each having a single gun. In order to provide frames of exposed film which are close together, the three cathode ray tubes may be mounted on opposite sides of the film as disclosed in the copending application of Norman F. Fyler entitled, "Cathode Ray Tube Apparatus," cited above.

The system of FIG. 3 is particularly useful in the case of theater video projection of a sports event. Such a presentation should take place at substantially the same time as the sports event. In view of the relatively brief time required for fixing the film, little time is lost in the presentation. It may also be noted that the video signals from the three tubes 91 through 93 are in a form which is particularly suitable for transmission from the scene of the sports event to the individual theaters. Furthermore, following permanent fixing and desensitizing of the film, a permanent full-scale display is available for subsequent showing of the sports event. Such showings may, of course, be either in movie theaters or on television.

FIG. 4 shows an alternative video-to-film transducer arrangement which may be employed in accordance with the present invention. In the arrangement of FIG. 4, video signals are supplied on lead 102 to a cathode ray tube 104 having conductive fibers extending through the faceplate of the tube in a generally linear array along line 106. A typical tube construction which is suitable for use in the embodiment of FIG. 4 is disclosed in patent application Serial No. 16,734, of Norman F. Fyler filed March 22, 1960, and entitled, "High Speed Cathode Ray Direct Writing Tube." In operation, the electron beam applies an electrostatic charge pattern on the ultraviolet film 108 as it is moved past the faceplate of tube 104. The combination of movement of the film relative to the faceplate concurrently with the sweeping of the electron beam as deflection voltages are applied on lead 110, produces a set of four frames 112 corresponding to those shown in FIG. 1. The tube 104 and unit 114 may therefore be substituted directly for the tube 14 and unit 18 of FIGS. 1 and 2. The image is in the form of an electrical charge distribution on the film 108. The developer box 114 includes arrangements for powdering the film, so that the powder will stick to the charged areas. The film is then subjected to ultraviolet light, the dust is removed and the film is heated to fix the image. By way of example, the heat may be applied at a temperature of 255° F. for two seconds to bring out the latent image in the form of thin layers of bubbles as discussed above. Following this fixing step, the film is routed to the projector.

Figure 5:
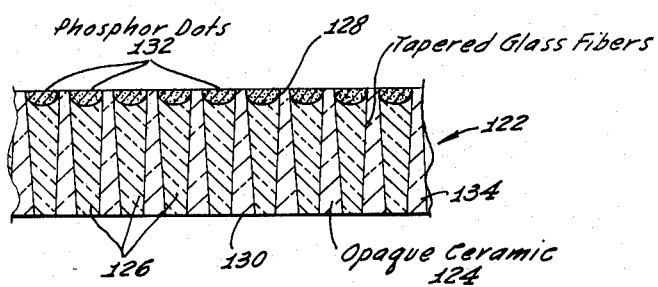
FIG. 5 shows a cross-sectional view of a fiber optic faceplate which may be employed in the apparatus of FIGS. 1, 2 or 3.

A typical form of fiber optic faceplace is shown in FIG. 5. The faceplate of FIG. 5 is patterned after the application of Norman F. Fyler entitled, "Cathode Ray Tube Apparatus," cited above. The faceplate 122 includes an opaque ceramic body 124 through which a series of fiber optic rods 126 extend. The inner surface of the faceplate 128 faces the cathode ray, and the film will normally contact or be close to the outer surface 130 of the faceplate. Small dots 132 of phosphor material may be located at the inner ends of the fiber optic elements 126. The phosphor material is chosen to have a spectral output characteristic corresponding to the spectral sensitivity of the film. Thus, for example, when ultraviolet sensitive film is employed, a phosphor is used which has a corresponding ultraviolet light output characteristic. As discussed in detail in the patent application noted above, the fiber optic rods may be formed by capillary action as they are drawn through small openings previously formed in the ceramic material 134.

In closing, it is useful to summarize some of the advantages of the present invention. An important feature involves the use of fiber-type cathode ray tubes in combination with film in systems which require high speed. In this connection it should be noted that films which are capable of simple and rapid fixing or developing tend to be rather "slow" and to require high levels of light intensity for proper exposure. Fiber-type cathode ray tubes permit the application of higher levels of light intensity to the film. Thus, the fiber-type cathode ray tubes make possible the use of cathode ray tubes in processes in which contemporaneous displays, or in which high frame reptition rates are desired. For heat fixing or development, one or two seconds or less may be required, but the transportation from the cathode ray tube to the projection unit may readily be less than ten seconds.

The frame rates which are contemplated in accordance with the present invention will now be considered. In the system of FIG. 2 in which military information is processed, frame rates of 1 to 10 frames per second are normally adequate. In connection with the system of FIG. 3, however, it is desirable to project signals at a frame rate above the optical perception flicker rate. Accordingly, the system may operate at a rate of 24 to 30 frames per second. In addition, for some military systems, such higher speeds may advantageously be employed. Adequate signals for many displays may be obtained by the use of successive snapshots at a rate of 10 per second. This is particularly true where the subject matter is not rapidly changing. In the course of all of the systems under discussion, however, the higher image intensities provided by fiber-type cathode ray tubes produce a great advantage over the corresponding cathode ray tubes which do not employ fibers. More specifically, higher frame rates are possible with any given type of film, and it is possible to expose many types of film which are easy to process and which could not be handled at all with cathode ray tubes having conventional faceplates.

Another advantage of the present invention arises from the use of ultraviolet sensitive film and a fiber-type cathode ray tube having ultraviolet light output. The resulting system not only has the advantages of speed as noted above, but may also be operated without shielding from visible light, as long as the visible light does not include strong ultraviolet spectral components.

It is to be understood that the above-described arrangements are illustrative of the application of the principles of the invention. Numerous other arrangements may be devised by those skilled in the art without departing from the spirit and scope of the invention. Thus, by way of example but not of limitation, the unit of FIG. 4 could be used with the systems of FIGS. 1 through 3, and the color vidicon arrangement of FIG. 3 could use a storage tube and a single gun cathode ray tube as shown in the system of FIG. 2. In addition, projection screens employing only two colors could also be used. Accordingly, it is to be understood that the present invention is limited only by the spirit and scope of the appended claims.

What is claimed is:

1. In a large scale military display system, means for storing information defining the positions and identification of a large number of aircraft, missiles or the like, means for reading out this information serially and applying it to separate color-coded areas of a storage tube, depending on the identification information, means for scanning the storage tube and coupling the video output signals to a fiber-type cathode ray tube having an ultraviolet light output, means for supplying ultraviolet sensitive film to said cathode ray tube for exposure to radiation from said cathode ray tube, means for heating said film to fix the images representing the separate color-coded areas, a projection screen, means for projecting the images of said separate areas in different colors, and for superposing the images on said screen, and means for advancing the film from said cathode ray tube to said projection means.

2. In a color recording system:
means for providing video signals representing a set of different color coded frames at a rate of up to 30 sets of frames per second, said means including a scan conversion storage tube, an additional storage unit, and means for impressing information from said storage unit onto said scan conversion storage tube;
a fiber optic type ultraviolet cathode ray tube;
means for applying the video signals to the cathode ray tube;
means for supplying ultraviolet sensitive film to the cathode ray tube to receive images at a corresponding rate;
means for heating the film to fix the impressed images; and
means for projecting sets of images impressed on the film.

3. In a large scale display system;
means for storing digital information relating to the positions and identification of a large number of aircraft, missiles or the like;
a cathode ray tube;
means for converting the stored digital information and applying the information pertaining to the different aircraft, missiles or the like, in color coded form to different positions of a cathode ray tube, with different classes of identified aircraft or the like being coded in a predetermined color;
means for exposing film to the cathode ray tube to form the different color coded images at different positions of the film; and
means for projecting the color coded images impressed on the film onto a screen.

References Cited by the Examiner
UNITED STATES PATENTS

| | | | |
|---|---|---|---|
| 2,612,553 | 9/1952 | Homrighous | 178—5.6 |
| 2,736,770 | 2/1956 | McNaney | 178—15 |
| 2,822,536 | 2/1958 | Sandretto | 343—11 |
| 2,922,352 | 1/1960 | Tuttle et al. | 96—66 |
| 2,976,354 | 3/1961 | Banning et al. | 178—6.6 |
| 2,982,173 | 5/1961 | Leighton et al. | 178—5.2 |
| 2,985,784 | 5/1961 | MacNeille | 178—7.85 X |
| 2,993,805 | 7/1961 | Kay | 96—49 |
| 3,027,219 | 3/1962 | Bradley | 178—7.85 |
| 3,032,414 | 5/1962 | James et al. | 96—91 |
| 3,038,959 | 6/1962 | Beurle | 178—7.85 X |

DAVID G. REDINBAUGH, *Primary Examiner.*
ROBERT SEGAL, *Examiner.*
J. A. O'BRIEN, *Assistant Examiner.*